(12) United States Patent
Dumont et al.

(10) Patent No.: US 9,286,482 B1
(45) Date of Patent: Mar. 15, 2016

(54) PRIVACY CONTROL BASED ON USER RECOGNITION

(71) Applicant: Amazon Technologies, Inc., Reno, NV (US)

(72) Inventors: Michael David Dumont, Sunnyvale, CA (US); Kenneth Paul Kiraly, Menlo Park, CA (US); Levon Dolbakian, Los Gatos, CA (US); Srinivasan Sridharan, Sunnyvale, CA (US); Nadim Awad, San Francisco, CA (US); Jonathan White Keljo, Seattle, WA (US); Arnaud Marie Froment, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 95 days.

(21) Appl. No.: 13/914,340

(22) Filed: Jun. 10, 2013

(51) Int. Cl.
*G06F 21/62* (2013.01)
(52) U.S. Cl.
CPC ..................................... *G06F 21/62* (2013.01)
(58) Field of Classification Search
CPC .......... G06F 21/00; G06F 21/32; G06F 21/42
USPC ........................................ 726/4, 28; 713/189
See application file for complete search history.

(56) References Cited

U.S. PATENT DOCUMENTS

| | | | | |
|---|---|---|---|---|
| 6,735,695 | B1 * | 5/2004 | Gopalakrishnan et al. | 713/186 |
| 7,117,356 | B2 * | 10/2006 | LaCous | 713/150 |
| 7,864,987 | B2 * | 1/2011 | Venkatanna et al. | 382/115 |
| 8,090,944 | B2 * | 1/2012 | Lee | 713/168 |
| 8,452,978 | B2 * | 5/2013 | Alward et al. | 713/185 |
| 8,539,550 | B1 * | 9/2013 | Terres et al. | 726/2 |
| 2009/0165125 | A1 * | 6/2009 | Brown et al. | 726/21 |
| 2010/0205667 | A1 * | 8/2010 | Anderson et al. | 726/19 |
| 2012/0144204 | A1 * | 6/2012 | Litz et al. | 713/186 |
| 2013/0138386 | A1 * | 5/2013 | Jain et al. | 702/141 |
| 2014/0283128 | A1 * | 9/2014 | Shepherd et al. | 726/28 |

* cited by examiner

*Primary Examiner* — Saleh Najjar
*Assistant Examiner* — Oleg Korsak
(74) *Attorney, Agent, or Firm* — Lee & Hayes, PLLC

(57) ABSTRACT

In some examples, an electronic device may include one or more recognition devices able to be used to recognize a current user. If the electronic device recognizes that a primary user, such as an owner, is currently using the electronic device, the electronic device may allow access to all of the primary user's private information and all of the features of the electronic device. On the other hand, when the electronic device determines that the current user is an unknown user, or that the current user is a known user who is authorized to access only limited information or features of the electronic device, the electronic device may send a communication to restrict the current user from accessing private information of the primary user. In some cases, the electronic device may enable the primary user to designate which items known users and/or unknown users may access.

22 Claims, 10 Drawing Sheets

PRIVACY CONTROL BASED ON USER RECOGNITION

BACKGROUND

People use electronic devices for a variety of purposes, such as making telephone calls, texting, accessing the Internet, sending and receiving emails, viewing, playing or consuming content, executing applications, playing games, navigation, and numerous other functions. Owners or authorized users of these electronic devices may sometimes let other users handle, view or otherwise access their electronic devices. In some cases, these electronic devices may contain private information of a personal, confidential or sensitive nature. Accordingly, while a user may want to permit another user to access the user's electronic device, such as for viewing or accessing a particular piece of content, or for performing a particular function, the user may not want the other user to be able to access other information or features on the electronic device that the user would like to remain private.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
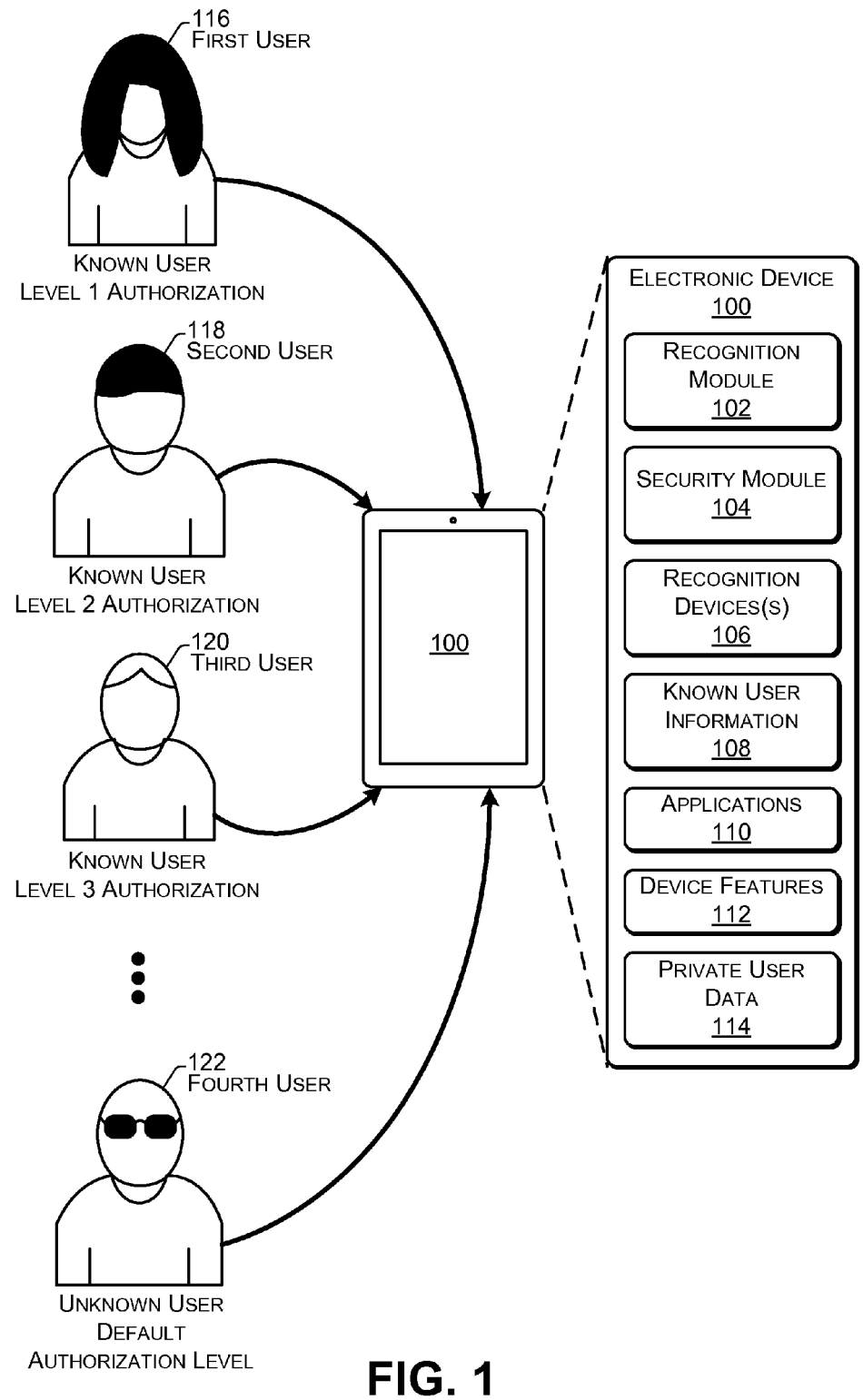
FIG. 1 illustrates an example electronic device able to control access based on user recognition according to some implementations.

This disclosure includes techniques and arrangements for protecting the privacy of a device owner or other authorized user of an electronic device. For example, the electronic device may include one or more functionalities to enable the electronic device to recognize and distinguish users from each other. Accordingly, when the electronic device recognizes that a primary authorized user, such as an owner, is currently using the device, the electronic device may allow full access to all of the primary user's information and all of the features of the electronic device. On the other hand, when the electronic device determines that the current user is not a known authorized user (i.e., and unknown user), or determines that the current user is a known user that has authorization to access only limited information or features of the device, the electronic device may send a communication to restrict the current user from accessing private information on the electronic device.

In some examples, the private information may include one or more of data, applications, settings or features of the electronic device that have been designated private by default or by the primary user. For example, certain types of information may be automatically designated as private information by default, such as passwords, payment system information, browsing history, browser bookmarks, user application data for one or more applications, calendar information, user emails and other documents, content items, menus or interfaces for accessing device features and settings, and so forth. Additionally, in some cases the user may decide whether certain information may be included as private information. For example, certain content items, applications, or other data may be designated by the user as private information, while other content items, applications or data may be designated as accessible to other users of the electronic device, such as regardless of an access authorization level.

When the primary user of the electronic device allows another user to access the electronic device, the electronic device may automatically recognize that the current user is not the primary user and may send a communication to hide or prevent access to the private information of the electronic device. When the other user gives the electronic device back to the primary user, the electronic device may recognize that the primary user is again the current user, and may unhide or allow access to the private information of the electronic device. As another example, if the electronic device is unable to recognize the current user, such as in the case that an unauthorized user is attempting to use the electronic device, the electronic device may send a communication to prevent the current user from accessing any private user information on the device, may lock down the device, or the like.

Many types of electronic devices are owned or used by a single individual who is the primary user, and who is authorized to access fully all of the features, applications and data on the electronic device. These electronic devices may sometimes be shared with other users, e.g., on a short-term basis, for a variety of reasons. Examples of such reasons may include showing digital content to the other users; receiving assistance with using a feature or function of the device, or allowing the other users to use the device for performing a function, such as making a phone call, accessing the Internet, or using an application. Accordingly, implementations of the electronic devices herein may use recognition techniques to distinguish between an unknown user, a known user of the device authorized to access some private information on the device, and a known primary user of the device authorized to access all private information on the device. Thus, based on the currently received the recognition data, the electronic device may dynamically switch or transition from one level of access authorization to another.

When the electronic device determines that the current user is not a primary authorized user of the device, the electronic device may limit the access of the current user based on permissions established by the primary user of the device. In addition, others, such as children, officemates, roommates, coworkers, thieves, etc., may pick up or access an electronic device without the knowledge or consent of the primary user.

In some examples, the electronic device may use recognition and identification techniques to determine that a current user is unknown or is a known user that is not authorized to access the device. As a result, the electronic device may lock out the current user, or may otherwise prevent the current user from accessing information and/or features of the device. When the electronic device determines, based at least in part on newly received recognition data, that a known authorized user is again in control of the electronic device, the electronic device may unlock access to the electronic device.

Alternatively, rather than locking out the unknown user entirely, the unknown user may be provided limited access to the electronic device. For example, unknown users may be provided a default level of access authorization, such as with no access to the private information of the primary user, but with access to one or more features or functions that are considered non-private, non-critical and not a security threat. Examples of such features, functions and information may include being able to view or play certain non-private content or use certain non-private applications or features, depending on the nature and purpose of the electronic device. When the electronic device determines that an authorized user is again in control of the electronic device, the electronic device may send a communication to no longer limit access to the private information on the electronic device.

Furthermore, some types of electronic devices may be shared between the members of a family. Accordingly, some implementations herein enable an electronic device to provide multiple different levels of access to different known authorized users. For example, each known user may be authorized for different user access authorization levels that allow for different behaviors of the electronic device for the different users. As one example, suppose that within a family of users that share the electronic device, both the mother and the father are authorized to have access to "one-click" purchasing capability, but their child is not authorized. Furthermore, the mother may have access to a particular application on the device while the father and the child may not be authorized to access the particular application. However, all three users may be able to access basic device settings, such as screen brightness, or speaker volume. Accordingly, when the electronic device recognizes a current user of the device, the electronic device may provide the appropriate level of access for that user with respect to the data, applications and other features of the electronic device. Further, the device may automatically modify certain features, such as settings menus, so that unauthorized users are not able to see certain features of the setting menus that they are not authorized to modify.

With the increasing penetration of electronic devices into daily life and with the increasing reliance users place on these electronic devices, there is frequently user data on an electronic device that primary users/owners do not necessarily want readily available to other users of the same physical device. Examples of such user data that a primary user may want to keep private may include emails, calendar information, payment system information; browsing history; passwords; browser bookmarks; application data; and content items, such as written documents, movies, videos, photographs, books, music, and so forth. To protect these and other types of private user data, implementations herein may maintain a user profile for one or more known or authorized users of the electronic device. For example, the electronic device can automatically recognize the current user as either being a known user or an unknown user, and can take steps to protect the device security and user privacy. Examples of data and features that may be hidden from unknown users or users with a lower level of access than the primary user may include device settings menus; calendars; emails; and other potentially private items, such as applications, documents, movies, books, music, television shows, browsing history, browser bookmarks, photographs, and social network access. Further, the electronic device may disable payment systems or require the current user to reenter payment data or passwords. Optionally, suppose that a primary user re-enters the payment data and/or password, such as when a parent authorizes a child to make in-application purchases. The current user (i.e., the child) may still be recognized as having limited authorization, and thus, may still be subject to application or operating system parental controls when making purchases. Further, when the electronic device determines that the current user is an unknown user or a user with a lower level of authorization, the electronic device may disable other saved passwords for various other services accessible by the electronic device.

For discussion purposes, some examples are described in the environment of a portable or handheld electronic device. However, the implementations herein are not limited to the particular examples provided, and may be extended to other types of user environments, other types of electronic devices, and to protection of other types of information and device features, as will be apparent to those of skill in the art in light of the disclosure herein.

FIG. 1 depicts an example electronic device 100 able to provide privacy control based on recognizing users according to some implementations. In the illustrated example, the electronic device 100 includes a recognition module 102, a security module 104, one or more recognition devices 106, and known user information 108. Furthermore, the electronic device 100 includes private information of the primary user, which may include one or more applications 110, device settings 112 and/or private user data 114. Implementations herein may protect some or all of the private information of the primary user from access by unknown users or known users that have a lower level of access authorization than the primary user. As one example, the recognition module 102 may be executed on the electronic device 100 for recognizing and distinguishing between various users of the electronic device 100. The recognition module 102 may recognize an identity of a current user of the electronic device 100 and may send information to the security module 104 regarding the identity of the current user. The security module 104 may perform one or more functions to apply security and privacy settings on the electronic device 100 appropriate for an authorization level the identified current user. For example, the security module 104 may send a communication, such as by broadcasting or otherwise sending a notification, instruction or other communication regarding an authorization level of the current user.

The one or more recognition devices 106 may include any type of sensor, component or other functionality able to assist in the recognition of a person currently using the electronic device 100. Several examples of the recognition devices 106 may include a camera for performing facial or other visual recognition with respect to a current user; a microphone for performing speaker recognition or voice recognition with respect to a current user; and a biometric feature detection device, such as a fingerprint reader for recognizing a thumb or finger of a current user. Furthermore, in some examples, the electronic device 100 may request that the current user enter a password or other authorization credential when the identity of the current user is in doubt.

The user information 108 may include one or more user profiles of one or more respective authorized users of the electronic device 100. For example, in the case of an electronic device that uses face recognition, voice recognition or fingerprint detection, the profile of the user may include user information for enabling such user recognition techniques. Accordingly, some examples herein provide a system that can automatically recognize the individual currently using the electronic device 100 by collecting information about the current user from the recognition devices 106. The electronic device 100 may then compare the collected information about the current user with similar information in the profiles of known and approved users when attempting to recognize the current user for determining the current user's authorized level of access. Furthermore, in some cases, the electronic device 100 may recognize from the user information 108 that a current user is a user that has been specifically identified by the primary user as not being authorized to access the device.

In some examples, the recognition module 102 may output a probability or likelihood that the current user of the electronic device 100 is the primary user or another known user. For instance, in some cases, the likelihood may be generalized to a state of either "Known User" or "Unknown User." When this state changes, a communication can be generated and sent as a notification to the rest of the electronic device 100, such as to notify the operating system, one or more applications, and/or other services, of a current authorization level to be enforced for the current user. As a result of this communication, the security module 104 of electronic device can enforce certain behaviors on the electronic device 100, which may include, but are not limited to: hiding applications that may include private data of the primary user; hiding content considered to be private either based on user identification of the content or based on default identification of the content (e.g., according to a type of content); disabling payment mechanisms on the electronic device 100; locking the electronic device 100 to prevent further access; hiding part or all of the primary user's browsing history; hiding browser bookmarks of the primary user; disabling stored passwords; disabling access to a device settings menu; and/or hiding other user data that the primary user has selected as being private.

The electronic device 100 can automatically determine that specific data and/or applications are private information of the primary user, such as based on default settings for various types of data or applications. Additionally, the electronic device 100 may provide a user interface that enables the primary user to change the privacy designation for selected data or applications. For example, a system options menu may provide a user interface that allows the user to specify whether a piece of content or an application should be private to some or all users. As one example, the primary user may designate as private a set of books that the primary user is reading, which may prevent others (e.g., coworkers, roommates, etc.) from seeing what the primary user is reading if they access the primary user's electronic device 100. As another example, a primary user may mark a first email account as private, while leaving a second email account public to other authorized users of the device. In some examples, emails and payment system information are by default automatically flagged as private and hidden from all users other than the primary user.

The electronic device can employ a different set of behaviors when the current user is recognized as a known primary user, rather than an unknown user, or a known user with limited access authorization. This can all be accomplished without having separate user accounts, logins, passwords, or the like for the different users. For example, the electronic device 100 may enable access to private content, may automatically unlock the device upon recognizing that the primary user is holding the device; and may either unlock the payment mechanisms, or keep the payment mechanisms locked until the primary user re-enters one or more credentials. Further, the settings for a recognized known user may also be configurable by the primary user. In addition, when the primary user accesses the device after a period of time, the primary user may be alerted if some unknown user or other known user has used or attempted to use the device during the period of time. For example, an alert can be provided in the form of a dialog box, a notification bar entry, or other user interface (UI) element displayed on a display of the electronic device 100. This alert can also allow the primary user to approve the previously "unknown" user to become an authorized user and thereby to be an additional known user of the electronic device going forward.

In the example of FIG. 1, a first user 116 may be a known primary user having a first level of user authorization. For example, the first user 116 may be the owner or other primary user of the electronic device 100. Accordingly, the first user 116 may be a primary user authorization to access all of the data on the electronic device 100, all of the applications on the electronic device 100, and all of the features of the electronic device 100, including the private information. In addition, while single primary user is described in this example, in other examples, there may be multiple primary users.

Furthermore, a second user 118 may be a known user having a second level of user authorization for the electronic device 100. For example, the second user 118 may be able to access most of the data, applications and features of the electronic device 100, but may be restricted from accessing one or more of particular private user data, private applications or private features, such as may have been selected by the primary user 116 to remain private. Similarly, a third user 120 may have a third, lower level of user authorization for the electronic device 100. Accordingly, the third level of user authorization may be comparatively different and/or more restrictive than the second level of user authorization. In addition, a fourth user 122 may be an unknown user having only a default level of authorization to access the electronic device 100, which may include substantially limited device access authorization. Additionally, in other examples, an unknown user may have no access authorization, and may be locked out of the electronic device 100 entirely.

As one example, suppose that the first user 116 is a mother/wife, the second user 118 is a father/husband and the third user 120 is a child in a family. Further, suppose that the first user 116 buys a new electronic device 100 and sets up the electronic device 100 with herself as the primary user. Next, suppose the first user 116 hands the electronic device 100 to the second user 118. In some cases, the electronic device 100 may not recognize the second user 118 and may determine that the second user is an unknown user. As a result, the electronic device 100 may permit the second user to access the electronic device 100 as an unknown user with only a limited default access authorization in which all or substantially all of the primary user's private information is hidden or inaccessible. As another alternative, the electronic device 100 may lock out the unknown user from accessing the electronic device 100 altogether.

As still another alternative, the electronic device 100 may determine that the first user 116 has handed the electronic device 100 to the second user 118, and therefore the second user 118 may be given at least a minimum default authorization level for a known user, such as a level 3 authorization, rather than the default authorization level for an unknown user. For instance, the electronic device 100 may make a determination of implied authorization using various techniques, such as based on one or more of a time threshold, a change in orientation of the device, the replacement of the visage of the first user 116 with that of the second user 118 within the time threshold, and the like. Accordingly, if the camera of the electronic device 100 no longer sees the face of the primary user, but is able to see the face of the second user 118 within 5 seconds of last seeing the face of the primary user, then the electronic device 100 may determine that the current user has at least an implied authorization from the primary user to use the electronic device 100. Based on this determination, the second user may be designated as a known user, rather than an unknown user and may be given a different level of access authorization.

As one example, a change in orientation of the electronic device 100 may be sensed by an onboard accelerometer or other sensors of the electronic device 100. Accordingly, if an accelerometer output determined within a time threshold (e.g., between last seeing the face of the first user 116 and first seeing the face of the second user 118) has a signature that is indicative of one user handing a device to another user, this may imply that the primary first user 116 has consented to the second user 118 accessing at least some content or features on the device. Consequently, the electronic device 100 may permit the second user 118 a default level of access for a known user (e.g., level 3 in the example of FIG. 1), which, for example, may merely hide from the second user 118 most of the personal or private content of the first user 114 and certain features of the electronic device 100, rather than locking out the second user altogether from the electronic device 100, or hiding all private information.

Subsequently, suppose that the second user 118 hands the electronic device 100 back to the first user 116. The electronic device 100 may recognize the first user 116 as the primary user who is again in control of the electronic device 100. Furthermore, the first user 116 may be provided with an option to increase the access authorization of the second user 118, such as to a higher level of access authorization (e.g., from level 3 to level 2 access authorization in this example). Consequently, the next time the second user 118 picks up the electronic device 100 the second user 118 will have access to the private content and features of the electronic device based on the level 2 access authorization level, rather than the default or level 3 authorization level. Further, in some examples, the second user 118 may be granted level 1 user authorization, rather than level 2, if the primary user so desires.

Furthermore, in this example, suppose that the first user 116 subsequently hands the electronic device 100 to the third user 120. The third user 120 may be granted the default or level 3 authorization level, such as based on an implied authorization indicated by the first user 116 handing the device to the third user 120. Thus, the third user 120 is able to use the electronic device 100 without having an account or login that is separate from that of the primary user. For instance, the user may access or use certain data, applications and/or features of the electronic device as permitted by the access authorization level, e.g., level 3 in this example. Alternatively, of course, as mentioned above, the electronic device 100 may initially assign the unknown user a default access authorization for unknown users upon detecting that the current user is an unknown user. As another alternative, the electronic device 100 may lockout the third user 120 until the first user 116 specifically grants the third user 120 the level 3 authorization for a known user. Once the third user 120 has been granted the level 3 authorization (either by implied authorization or explicit authorization), the third user 120 becomes a known user with respect to the electronic device 100. Subsequently, should the third user 120 be recognized as the current user of the electronic device 100, the based on the automatic recognition, the third user 120 may be permitted by the electronic device 100 to use the electronic device 100 and access the private information of the primary user within the restrictions of the level 3 authorization. Any number of known users may be authorized to use the electronic device 100 within the restrictions of various levels of authorization.

Additionally, in this example, suppose that the fourth user 122 picks up the electronic device 100. The fourth user 122 may be a user that has not previously used the electronic device 100 or is otherwise not recognized by the electronic device 100. Thus upon determining that the fourth user 122 is an unknown user, and further that there is no implied authorization from the primary user, the electronic device 100 may grant the fourth user only default access authorization for an unknown user. Alternatively, the electronic device 100 may lockout the unknown forth user 122, may issue an alert, such as by sending a message to another electronic device of the primary user, may sound an audible alarm, or the like. Subsequently, the primary first user 116 may again access the electronic device 100 and may be notified that the unknown fourth user 122 attempted to access the electronic device 100. Further, in some examples, the electronic device 100 may display an image of the unknown user to the primary user, and may provide the primary user with the option to authorize the unknown user as a known user.

In addition, in some examples, rather than providing a 100% certain identification of a current user, the recognition module 102 may instead provide a likelihood, probability or level of confidence that the current user is a particular known user. For example, data about the current user from the recognition devices may be compared with previously stored information about known users, such as one or more profiles of recognition information maintained for known users. Based on the comparison, the recognition module 102 may indicate that there is a certain likelihood that the current user is a particular known user. The likelihood or level of confidence of the recognition module 102 may also be used, at least in part, to determine the level access authorization of the current user. For example, suppose that the recognition module is only 50% certain that the current user is the primary first user 116. Accordingly, rather than allowing the current user to access all of the private data, applications and features of the electronic device 100, such as with a level 1 authorization, the electronic device 100 may restrict the current user to a different level of authorization, such as the default level 3 authorization, based on the uncertainty of the recognition. As one example, a confidence level of 90% or higher that the current user is the primary user may result in a level 1 authorization, a confidence level of 70% or higher may result in a level 2 authorization, a confidence level between 30% and 70% may result in a level 3 authorization, and a confidence level below 30% may result in the current user being treated as an unknown user. Should the current user attempt to access data or other features above the level of authorization, the electronic device 100 may request additional verification information or credentials to verify that the current user is the primary user such as by requesting entry of a password, provision of a fingerprint, and so forth. Such differentiations in confidence level may also be applied to other known users, and numerous other variations will be apparent to those of skill in the art having the benefit of the disclosure herein.

Figure 2:
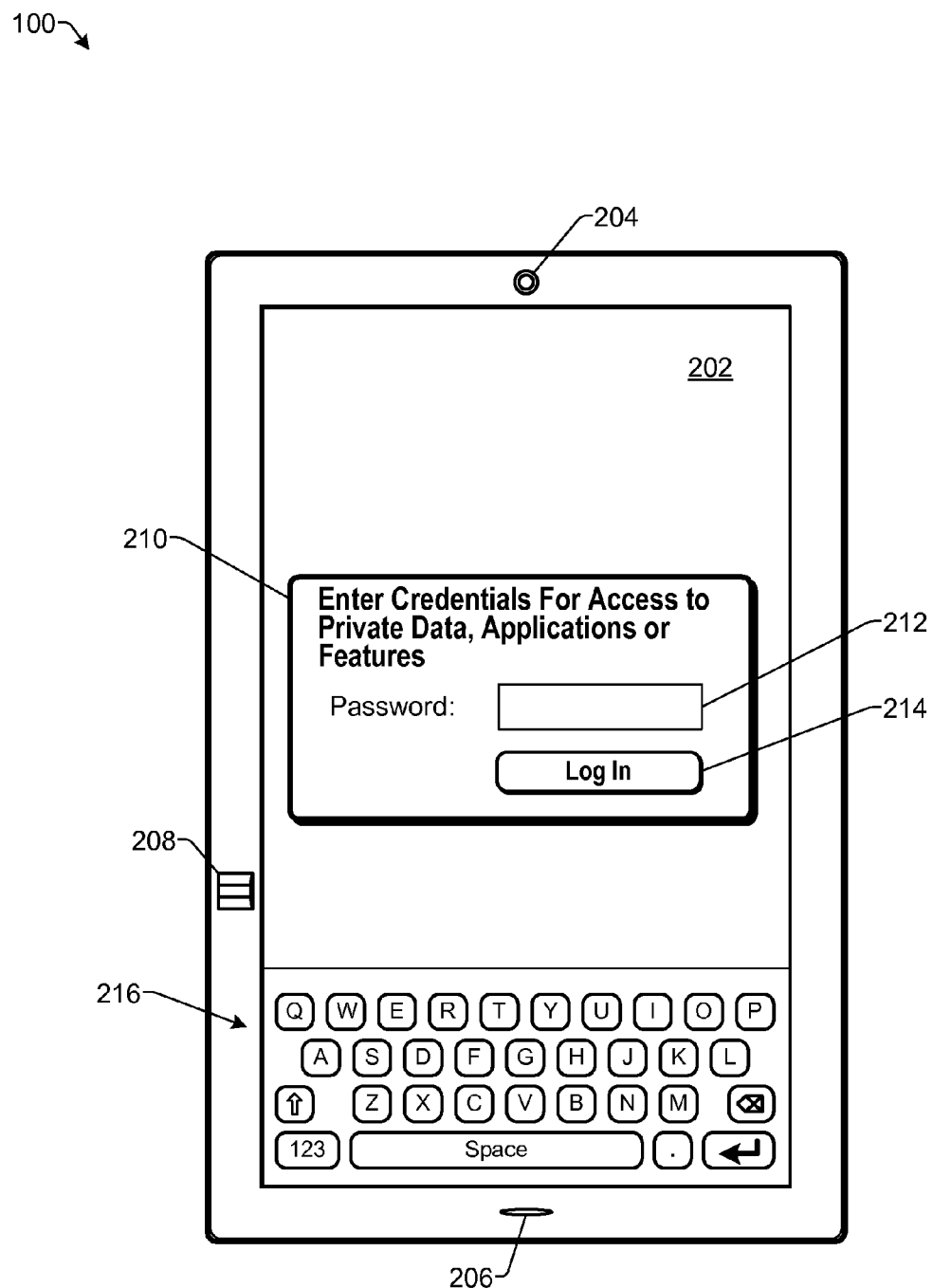
FIG. 2 illustrates an example electronic device able to recognize users according to some implementations.

FIG. 2 illustrates an enlarged view of the example electronic device 100 according to some implementations. In this example, the electronic device 100 includes components, such as a display 202 to present information to a user, a camera 204, a microphone 206, and a biometric device 208. Examples of the biometric device 208 may include a biometric feature detection device such as a fingerprint reader, a blood vessel pattern detector, a DNA detector, or the like. Furthermore, implementations herein are not limited to any particular type or configuration of the electronic device 100 and thus, in some examples, the electronic device 100 may be provided without one or more of the display 202, the camera 204, the microphone 206 and/or the biometric device 208, or may have these components in different locations or different configurations. In addition, the electronic device 100 may have various other types of sensors, recognition devices, and the like (not shown in FIG. 2), that may be used for recognizing and distinguishing one user from another user.

In some examples, the display 202 may have an associated touch sensor, and may thereby be a touch-sensitive display that can also serve as an input device. Consequently, when the electronic device 100 has a low confidence level with respect to the identity of the current user, the electronic device 100 may present a dialog box, window, or other type of UI element 210 on the display 202 requesting that the current user enter a password 212 or other credential to perform a login function 214. For instance, in the case of a touch sensitive display 202, a virtual keyboard 216 may be presented on the display 202 along with the window 210 to enable the user to enter the password. Alternatively, other suitable type of credential verification may be employed, such as a physical keycard or smart card, one or more security questions, the biometric device 208, and so forth. Thus, based on the currently received recognition data, the electronic device 100 may dynamically switch or transition from one level of access authorization to another. For instance, while the device is being used, if the electronic device 100 determines based on current recognition data that the current user does not match a known user profile, the electronic device 100 may present the UI element 201.

As one example, suppose that the primary user starts playback of a video on the electronic device 100, and passes control of the electronic device 100 to another user, such as by handing the electronic device to the other user, placing the device in front of the other user, or otherwise placing the electronic device 100 within at least partial control of the other user, who then becomes the current user. The electronic device 100 receives new recognition data with respect to the current user but, based on a comparison with known user profiles, does not recognize the current user. The electronic device 100 may continue playback of the video uninterrupted, but may also send a communication to at least one of the operating system or an application on the electronic device 100 to reset the access authorization level on the electronic device 100 to the access authorization level corresponding to an unknown user. This change in access authorization level may take place in the background and may be entirely unapparent to the current user unless the current user attempts to access private information of the primary user that is not permitted under the current access authorization level.

Continuing this example, suppose that the video ends and the current user attempts to open an email application on the electronic device. Further, suppose that the access authorization level for an unknown user does not permit access to email of the primary user. Thus, when the current user attempts to access the portion of private information of the primary user that is not permitted under the authorization level for an unknown user, the electronic device 100 may present the UI element 210, and require entry of credentials before allowing the current user to access private information of the primary user outside of the current access authorization level. As one example, the current user may pass the electronic device to the primary user, who enters the requested credentials, and then passes the electronic device back to the unknown user. Based on this exchange, in some cases, the electronic device 100 may reclassify the current user from an unknown user to a known user having a lower level of access authorization than the primary user. The electronic device 100 may then permit the unknown user to access the email application. The electronic device 100 may further establish a known user profile for the current user and may store recognition data for the current user in the known user profile. Thus, the electronic device may automatically and dynamically switch or transition from one level of access authorization to another as the electronic device is being used, such as when control passes from one user to another, and the transition in access authorization may be transparent to the current user so long as the current user does not attempt to access private information not permitted by the access authorization level.

Furthermore, the electronic device 100 may include various external controls and input devices that are not shown in this example. For instance, in addition to, or in place of, the touch sensitive display 202, some implementations of the electronic device 100 may include a physical keyboard or keypad, a mouse, a pointing stick, a touchpad, a trackball, a joystick, a remote control, buttons and/or various other controls for performing various desired inputs and interactions with the electronic device 100. Thus, implementations are not limited to the electronic device 100 shown in FIG. 1, but may include various other types of electronic devices described herein.

Figure 3:
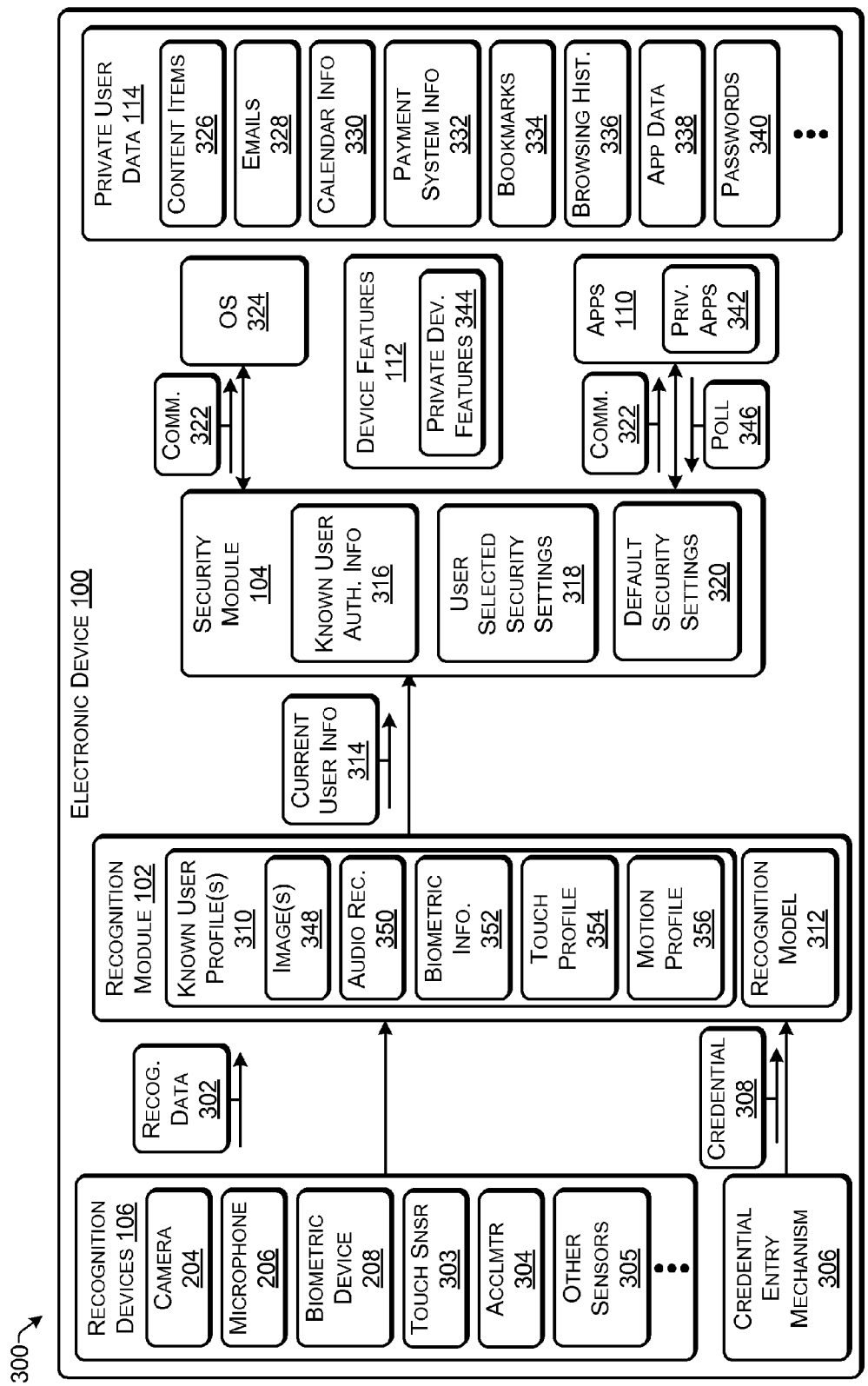
FIG. 3 illustrates an example framework enabling privacy control based on user recognition according to some implementations.

FIG. 3 illustrates an example framework 300 for controlling privacy based on user recognition according to some implementations. In this example, the electronic device 100 includes the recognition module 102 and the security module 104 that may be executed on the electronic device 100. The recognition module 102 may receive recognition data 302 from one or more of the recognition devices 106, such as the camera 204, the microphone 206, the biometric device 208, an accelerometer 303, a touch sensor 304 (which may be associated with the display), and/or other sensors 305. For example, sensor data from the accelerometer 303 may provide an indication of a pattern or profile of user motion, user handling, user mannerisms, user gait recognition, etc., that is individually distinguishable from patterns or profiles attributable to other users. In addition, a pattern or profile of touch inputs made to the touch sensor 304 by a user may be used to distinguish one user from another. For instance, the touch input profile of a user may indicate a size of touches, a speed of touches, pressure applied during certain touches, motions or gestures made, or the like, which may be distinguishable from touch inputs and gestures of other users. Further, the recognition module 102 may receive input from other sensors 305 of the electronic device, such as a gyroscope or any other sensor(s) that may be used to aid in recognition of a current user and/or determination of a condition of the electronic device, such as the handing of the electronic device from one user to another. In addition, the electronic device 100 may include a credential entry mechanism 306 to enable the user to provide a credential 308, such as a password or the other credentials discussed above.

The recognition module 102 may include or may access known user profiles 310 and a recognition model 312. For example, the recognition model 312 may receive the recognition data 302 from the recognition devices 106, and apply recognition techniques using the known user profiles 310 for determining whether the current user is a known user. For example, the recognition model 312 may be an algorithm, a trained statistical model, or any other suitable logic that provides user recognition capabilities. Examples of visual recognition techniques that may be used for facial recognition, body recognition, iris recognition, retina recognition, or the like, may include principal component analysis using eigenfaces, linear discriminate analysis, elastic bunch graph matching using the Fisherface algorithm, hidden Markov models, multilinear subspace learning using tensor representation, and neuronal motivated dynamic link matching, to name a few. Similarly, for speaker recognition or voice recognition, the recognition model 312 may employ various techniques, such as storing voice prints, frequency estimation, hidden Markov models, Gaussian mixture models, pattern matching algorithms, neural networks, matrix representation, vector quantization and decision trees. Further, implementations are not limited to any particular type of recognition model 312, and thus may employ any combination of algorithms, learning models, statistical models, feature vectors, logic functions, and so forth. In addition, in the case of utilization of a biometric sensor, such as a fingerprint reader, the recognition model 312 may include various fingerprint comparison and matching algorithms, or other suitable algorithms, models or logic, depending on the biometric feature being sensed. Further, in the case that the recognition data 302 is received from the accelerometer 303, the touch sensor 304, or the other sensors 305, the recognition model 312 may include a suitable recognition capability, algorithm, statistical model, or the like, for the type of data received, such as motion data, touch input data, etc., for distinguishing a profile associated with one user from that of another user.

In some examples, if the recognition module 102 is unable to recognize or determine the identity of the current user, the recognition module 102 may employ the credential entry mechanism 306 to attempt to verify the current user. For example, if the confidence level of the recognition module 102 is below a threshold for the primary user, the recognition module 102 may request a password or other credential 308 from the primary user.

The security module 104 may receive current user information 314 from the recognition module 102 based on the results of comparing the recognition data 302 with the known user profiles 310, such as through execution of the recognition model 312. For instance, the current user information 314 may provide a likelihood or confidence level that the current user is a particular known user, or alternatively an unknown user. In the case that the current user is a known user, the security module 104 may access known user authorization information 316 for determining user selected security settings 318 and default security settings 320 to be applied to the electronic device 100 while the current user is using the electronic device 100, e.g., level 1 authorization, level 2 authorization, level 3 authorization, and so forth. In the case of an unknown user, the default unknown user authorization level may be applied for all unknown users.

To enable the electronic device 100 to enforce an access authorization setting, the security module 104 may send a communication 322 to set or indicate an authorization level of the current user of the electronic device. The communication 322 may be sent to an operating system 324 of the electronic device 100 and/or to one or more applications 110 on the electronic device 100. In some examples, the communication 322 may be a notification, instruction or other communication broadcast or otherwise sent to the operating system 324 and/or to the one or more applications 110, and that includes the authorization level and/or the security settings for the current user. In some examples, the communication 322 may be broadcast to all applications and the operating system, while in other examples, the communication may be sent only to particular applications and particular services or features of the device that are designated as private. Further, in other examples, the communication 322 may be sent to an application or service in response to a poll or other request from the application, service or feature, such as when the current user attempts to access the application, service or feature.

The communication 322 may establish the authorization level of the current user, which may restrict the ability of the current user to access certain private applications 110, certain private features 112 and/or certain private user data 114 on the electronic device 100. For example, the operating system 324 may limit the current user from using certain features 112 of the device, such as by preventing the current user from accessing at least a portion of a settings menu of the electronic device 100 to prevent the current user from changing certain device settings, or to prevent the current user from using various functions of the electronic device 100. As an example, the operating system may prevent the current user from making a phone call, sending a text message, accessing email services, and so forth, depending on the level of authorization of the current user, and the type and purpose of the electronic device 100.

In addition, the communication 322 may cause the operating system 324 to hide or prevent access to certain private applications 110 and/or certain private data 114. For instance, some applications 110 may be designated private by default, or the user may specify that the applications are private for certain levels of authorization. For example, when an application is first downloaded or otherwise placed onto the electronic device 100, a security setting for the application may be established either by default by the security module 104 or based on a recommended setting established by the developer or provider of the application. As mentioned above, the primary user may have the ability to change the default security settings for various applications, various types of user data, specific instances of applications or data, and so forth. As one example, if the application does not have a recommended security setting or level, the default action may be for the application to be blocked from access by users having an access authorization level lower than the primary user. If the primary user desires a setting for a particular application other than the default security setting, the primary user may apply a user-selected security setting such as by using a user settings interface discussed additionally below with respect to FIG. 4.

Examples of private data 114 may include content items 326, such as documents, books, magazines, newspapers, movies, music, video recordings, audio recordings, photographs, etc.; emails 328; calendar information 330; payment system information 332; browser bookmarks 334; browsing history 336; application data 338; passwords 340; and so forth. In some cases, some or all of the private user data 114 may be stored in a secure area of the electronic device 100 that may be blocked off or hidden by the operating system and/or the applications 110 from access by a user having an authorization level that does not allow access to the private user data 114.

Furthermore, in some examples, one or more of the applications 110 may be able to implement different levels of authorization based on the communication 322 independently of the operating system 324. For example, the applications 110 may include functionality that recognizes the communication 322 and an authorization level specified by the communication 322. In the case that the application 110 is one that the primary user would like to remain private from other known users of lower authorization levels, the application 110 itself may change the appearance of the application icon displayed on the device to indicate that the application is private, may blackout the application icon, cause the application icon to not be displayed, may prevent the current user from opening the application, or may open a redacted version of the application that does not include the ability to access any application user information of the primary user.

Accordingly, in some examples, an application may have the capability to determine for itself how to hide or otherwise protect the private application data of the primary user based on the authorization level of the current user of the electronic device 100. For instance, if the authorization level shows that the current user is not allowed to access the private data of the primary user, the application 110 may enforce this protocol by only allowing the current user to access non-private information through the application. As one example, if the application is a game, the game may require the current user to start a new game rather than providing the current user an option to access any of the saved games of the primary user. As another example, in the case of a document reader application, the document reader application, by default, may flag in advance as being private any documents that the primary user may have downloaded from a work location, and may prevent the current user from seeing or accessing any of those documents flagged as being private. Accordingly, in some examples the communication 322 is essentially propagated to all of the applications 110 and the operating system 324 or relevant operating system services, and each application 110 and the operating system 324 or particular operating system services (e.g., phone, text, etc.) can decide, based at least in part on the authorization level of the user, and based at least in part on the security settings 318, 320, how to protect the private information of the primary user.

As discussed above, when the electronic device 100 is handed to a different user, or when a different user otherwise accesses the electronic device 100, the recognition module 102 may determine that there is a new current user of the device 100, and may perform recognition on the new current user to attempt to determine whether the new current user is a known user. Suppose that the new current user is a known user with a different authorization level than the previous user. In response, the security module may send a new communication 322 to the operating system 324 and/or to the applications 110, to change the privacy settings on the electronic device 100 to correspond to the authorization level of the new current user. On the other hand, if the new current user has the same authorization level as the previous user, then it is not necessary for the security module 104 to send a new communication 322.

Furthermore, in some examples, an application 110 or feature 112 of the electronic device 100 may be inactive, unopened, turned off, or the like, when the communication 322 is sent. As one example, such as in the case of an application 110, suppose that the application 110 is selected or activated by the current user following the generation of the communication 322. Upon becoming active, and prior to displaying or permitting access to any user data, the application 110 may poll the security module 104 with a polling event or poll request 346 to determine the authorization level of the current user of the electronic device 100.

In some cases, the security module may re-send the communication 322, either to the polling application or to the entire device, or may send another type communication to the polling application 110. For instance, in some cases, the communication 322 may be sent in response to receiving a poll 346 from an application 110, and the communication 322 may be sent only to the polling application 110, or to all applications 110 and/or to the operating system 324. Based on the response received from the security module 104, and in accordance with the authorization level of the current user, the polling application 110 may protect the private information related to, or accessed by, the polling application 110 on the electronic device 100. Further, in some examples, features or services of the operating system 324 and/or the features 112 of the device may perform a similar polling function to determine the authorization level of the current user, such as when the user attempts to access those services or features. Thus, in some examples, rather than sending the communication 322 in response to recognizing the user, the communication 322 may be sent in response to a poll 346 from one or more applications, features or services of the electronic device 100 that a current user is attempting to access.

Each known user profile 310 may include recognition data previously received by the electronic device 100 regarding the respective known user to which the known user profile 310 applies. For example, in the case that visual recognition is used, at least in part, for identifying a known user, the known user profile 310 may contain recognition data that includes one or more images 348 of the face, iris, or other portion of the known user. For instance, the one or more images 348 may have been obtained during initial set up of the electronic device 100, or when an unknown user became authorized as a known user, or at any other time in the past during which the known user may have been using the electronic device 100. The one or more images included in the known user profile 310 can be used for comparison with a current image of a current user to determine a likelihood that the current user is the known user corresponding to the particular known user profile 310. For example, the recognition data 302 received from the recognition devices 106 may include a current image captured by the camera 204 of the current user of the electronic device, and the current image may be compared with the one or more images 348 in each known user profile 310 to determine a likelihood that the current user is a known user. In some examples, a suitable recognition model 312, such as an algorithm, classifier, or trained statistical model, as discussed above, may be used to perform the comparison between the current recognition data 302 and the known user profile 310. When the comparison indicates that the likelihood that the current user is a known user is greater than a threshold amount, the current user may be recognized by the recognition module 102 as a particular known user.

As another example, in the case that voice recognition is used, at least in part, for identifying a known user, the known user profile 310 may contain recognition data that includes one or more audio recordings 350 of the voice of the known user. The one or more audio recordings 350 can be used for comparison with a currently received voice recording of a current user, obtained through the microphone 206, to determine a likelihood that the current user is the known user corresponding to the particular known user profile 310.

As another example, in the case that biometric recognition is used, at least in part, for identifying a known user, the known user profile 310 may contain recognition data that includes biometric information 352 previously obtained from the known user. The biometric information 352 can be used for comparison with biometric information received from a current user, e.g., obtained through the biometric device 208, to determine a likelihood that the current user is the known user corresponding to the particular known user profile 310.

As another example, in the case that touch sensor data is used, at least in part, for identifying a known user, the known user profile 310 may contain recognition data that includes a touch profile 354 of the known user that can be used for comparison with currently-received touch inputs of a current user to determine a likelihood that the current user is a particular known user. For example, each user may use particular gestures or mannerisms in making touch inputs that can be distinguished from those of other users in a fashion similar to distinguishing handwriting. As a known user uses the electronic device 100 over a period of time, the electronic device is able to compile a touch profile 354 for each known user. The touch profile 354 can be used, at least in part, for establishing a probability that the current user is a particular known user, and for distinguishing the particular known user from other known users and unknown users.

As still another example, in the case that accelerometer data is used, at least in part, for identifying a known user, the known user profile 310 may contain recognition data that includes a motion profile 356 of the known user. The motion profile 356 of the known user can be used for comparison with currently received accelerometer data of a current user to determine a likelihood that the current user is a known user. For example, each user may perform recognizable motions, mannerisms, etc., when using an electronic device, and these motions may be captured by the accelerometer 304. As a known user uses the electronic device 100 over a period of time, the electronic device 100 is able to compile a motion profile for each known user that can be used, at least in part, for establishing a probability that the current user is a particular known user, and for distinguishing the particular known user from other known users and unknown users.

As mentioned above, other sensors 305 may also be used for obtaining recognition data for the known user profiles 310. Furthermore, combinations of the above-described recognition data may be used for recognizing a current user as a particular known user. For example, if comparison of the recognition data 302 for a current user with a known user profile 310 shows a likelihood from multiple different types of recognition data that the current user is a known user, then the probabilities of each type of recognition data may be compounded to increase the overall likelihood that the current user is the known user. As one example, if the visual recognition comparison shows a 60% probability that the current user is a particular known user; the voice recognition comparison shows a 65% probability that the current user is the particular known user; the touch profile comparison shows a 55% probability that the current user is the particular known user; and the motion profile comparison shows a 50% probability that the current user is the particular known user, then a higher level of confidence may be given to identifying the current user as the particular known user than would be the case if only one of these recognition techniques were used. For example, a combined recognition threshold for confirming that the current user is a known user may be lower than individual recognition thresholds for each of the different types of recognition data if used singly.

Figure 4:
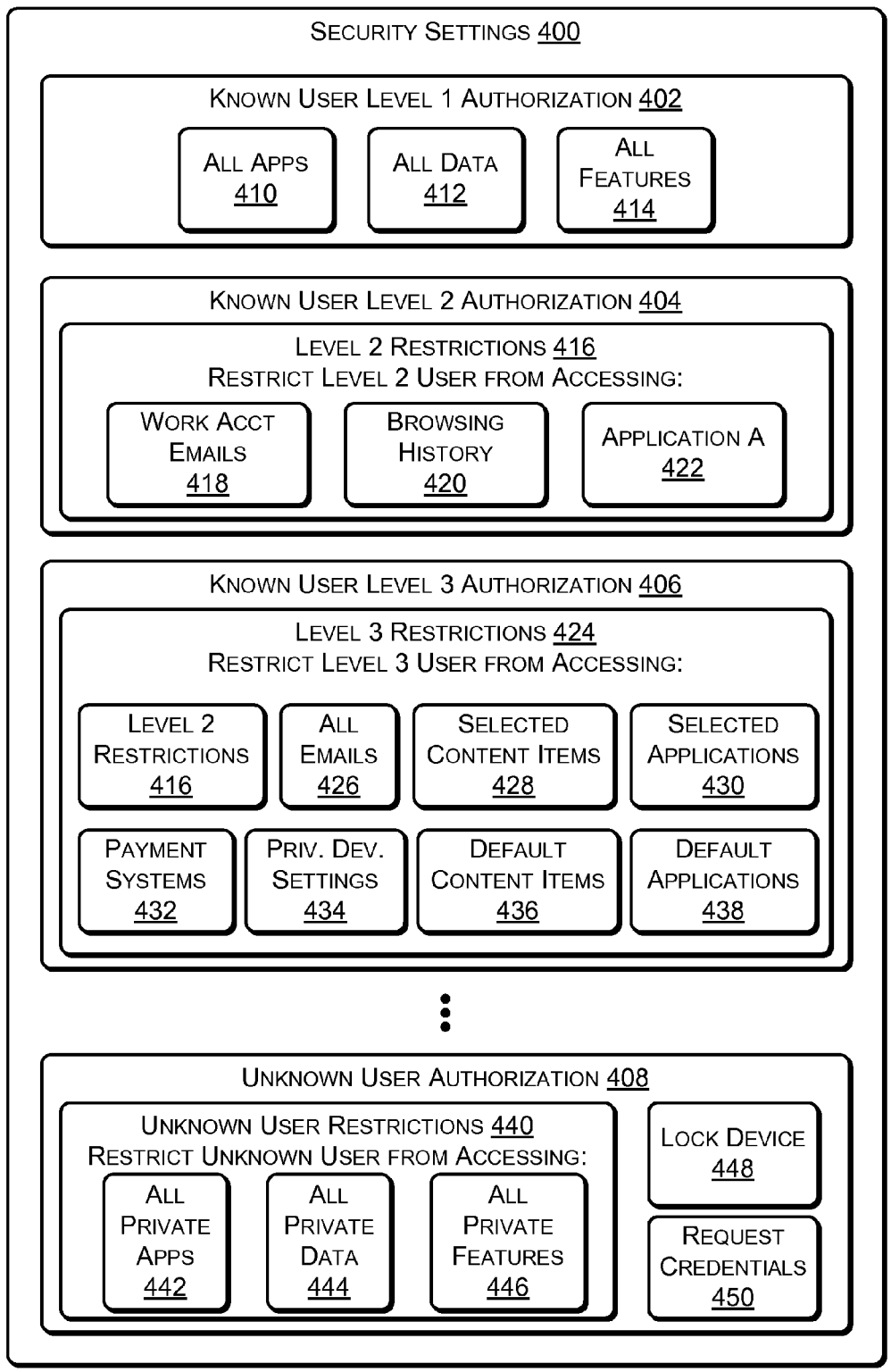
FIG. 4 illustrates an example user interface for establishing levels of access authorization on an electronic device according to some implementations.

FIG. 4 illustrates an example security settings interface 400 that the primary user may employ to customize the security settings for various different authorization levels of known users and unknown users. For instance, the default security settings 320 may establish various default levels of access to applications, private data and device features for various different known user authorization levels. The example security settings interface 400 may display the default security settings 320 and may enable the user to set user-selected security settings 318, such as to modify the default security settings 320 for various user authorization levels and/or establish custom security settings for individual known users. In some examples, the device may present a request for additional credentials, e.g., a password, such as described above with respect to FIG. 2, prior to allowing even the primary user access to the security settings interface 400. Further, in some cases, the primary user may provide one or more other known users authorization to access the security settings interface 400. Accordingly, those other known users may be required to enter a credential provided by the primary user or their own password or other credential.

In this example, the security settings include settings for the known user level 1 authorization 402, the known user level 2 authorization 404, the known user level 3 authorization 406, and the unknown user authorization level 408. For instance, the known user level 1 authorization 402 indicates that the level 1 authorization grants access to all applications 410, all data 412 and all device features 414 for any known user having level 1 authorization, i.e., the primary user. Furthermore, level 2 restrictions 416 indicate that a known user having level 2 access authorization is restricted from accessing work account emails 418, browsing history 420, and a particular application referred to as application A 422. In addition, level 3 restrictions 424 indicate that a known user having level 3 access authorization is restricted from accessing items specified in the level 2 restrictions 416, in addition to all emails 426, selected content items 428, selected applications 430, payments systems 432, private device settings 434, default content items 436, and default applications 438.

Additionally, unknown user restrictions 440 indicate that according to a default access authorization, an unknown user is restricted from accessing all private applications 442, all private user data 444, and all private device features 446. Furthermore, the user may optionally select a "lock device" 448 setting which indicates that the electronic device 100 should lock itself when the current user is an unknown user, and/or a "request credentials" 450 setting that indicates that the electronic device 100 should request credentials from the user or the primary user when the current user is an unknown user. Thus, in some examples depending on the nature of the electronic device 100, unknown users may be granted some access to the electronic device 100, such as the default authorization level for unknown users that permits the unknown user to use some functions of the electronic device 100 without accessing any private information of the primary user of the electronic device.

Furthermore, there may be additional levels of user authorization that are not shown in the example of FIG. 4, such as a level 4 access authorization for known users that is more restrictive than the level 3 authorization illustrated, a level 5 access authorization for known users that is more restrictive than the level 4 access authorization, and so forth. Alternatively, as another example, the primary user may specify different custom levels of authorization for each known user of the electronic device 100.

Figure 5:
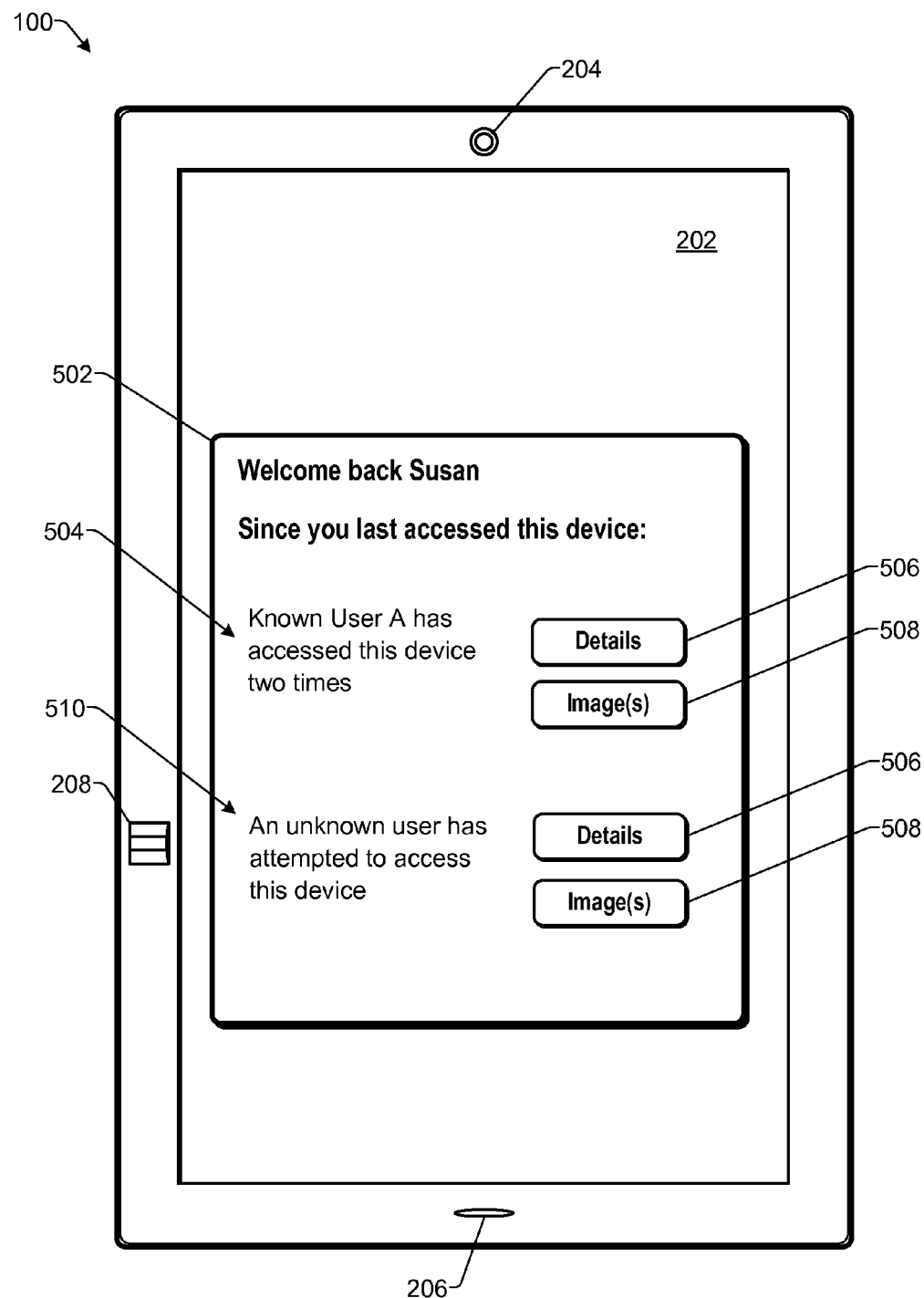
FIG. 5 illustrates an example interface for notifying a user of access to an electronic device made by other users according to some implementations.

FIG. 5 illustrates an example banner, window or other UI element 502 that may be presented to the primary user according to some implementations. For example, when the primary user accesses or uses the electronic device 100 after a period of time, the primary user may be presented with the UI element 502 providing information to the primary user regarding any other users that may have accessed or attempted to access the electronic device 100 during the period of time since the primary user last used the electronic device 100. In this example, the UI element 502 includes a message 504 indicating that user A has accessed the electronic device two times since the last time the primary user accessed the electronic device 100. The UI element 502 further includes a details button 506 adjacent to the message 504 to enable the primary user to obtain more details regarding the accessing of the electronic device 100 by the user A. For example, the primary user may select the details button 506 to determine when and for how long the user A accessed the electronic device 100. The UI element 502 further includes an images button 508 adjacent to the message 504 to enable the primary user to view any images taken by the electronic device 100 when recognizing the user A during accessing of the electronic device 100. For example, the primary user may select the images button 508 to verify that it was in fact user A who accessed the electronic device 100.

In addition, in the example of FIG. 5, the UI element 502 includes a message 510 indicating that an unknown user accessed or attempted to access the electronic device 100. For example, the primary user may select the adjacent details button 506 to learn when the unknown user attempted to access the electronic device 100. Further, the primary user may select the images button 508 to view one or more images of the unknown user that attempted to access the electronic device 100.

Figure 6:
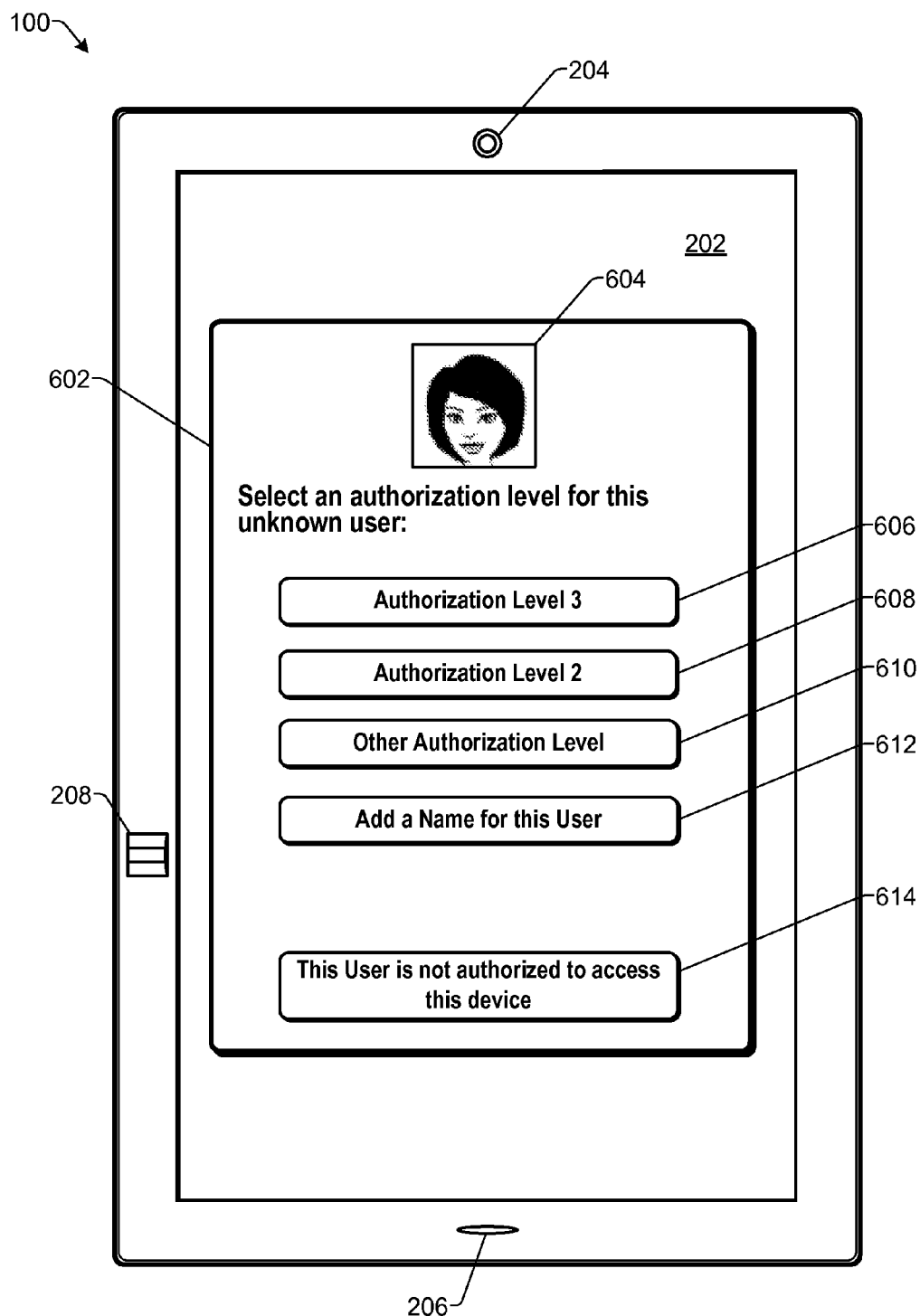
FIG. 6 illustrates an example interface for authorizing an access level of a user according to some implementations.

FIG. 6 illustrates an example banner, window or UI element 602 that may be presented to the primary user according to some implementations. For example, when an unknown user has been detected by the electronic device 100, the unknown user may be a locked out of the device 100 until the primary user authorizes the unknown user, such as in the case in which there is no implied authorization for the unknown user, or in the case in which an unknown user attempts to access the electronic device 100 without the knowledge of the primary user. As one example, the UI element 602 may be displayed in response to the primary user selecting the images button 508 adjacent to the message 510 described above with respect to FIG. 5.

The UI element 602 may display one or more images 604 of the unknown user captured by the camera 204 of the electronic device 100. The UI element 602 may also present various options to the primary user with respect to the unknown user. For example, an authorization level 3 option 606 may enable the primary user to assign authorization level 3 to the unknown user; an authorization level 2 option 608 may enable the primary user to assign authorization level 2 to the unknown user; and another authorization level option 610 may be selected to enable the primary user to assign another authorization level such as authorization level 1 or a custom authorization level. Furthermore, an option 612 enables the primary user to assign a name to the unknown user. For example, the electronic device 100 may add the previously obtained image 604, the name and the authorization level to a new known user profile for the user.

In addition, an option 614 enables the primary user to explicitly specify that the unknown user is not allowed to access the electronic device 100. Accordingly, if option 614 is selected, and the unknown user attempts to access the electronic device 100 again in the future, an alert, such as a text, a phone call, or an email may be sent to another electronic device of the primary user, an audio alarm may be sounded by the electronic device 100, or the like.

In addition, in some examples the primary user may authorize an access level of another user in advance, i.e., before the other user attempts to access the electronic device 100. As one example, the primary user may provide the other user with a password or access code for a default level of access authorization on the electronic device 100. Subsequently, when the other user attempts to access the device 100, the other user may enter the access code and the electronic device 100 may then begin collecting facial recognition information, voice recognition information, biometric information, and so forth, so that the other user will henceforth be a known user having a specified level of access authorization with respect to the electronic device 100. As another example, the primary user may provide a photograph or image 604 of the other user to the electronic device 100. The image 604 of the other user may then be displayed in the window 600, and the primary user may select an authorization level for the other user, and optionally enter a name for the other user. Later, when the other user picks up the electronic device 100, or otherwise attempts to access the electronic device 100, the electronic device 100 may use facial recognition techniques, or the like, to compare the face of the other user with the image provided by the primary user. Accordingly, the electronic device 100 may automatically grant the other user access to the electronic device 100 with the specified authorization level based on recognizing the other user through facial recognition based on the image provided by the primary user. Similar advance authorization for the other user may be enabled using other techniques, such as by providing biometric information for the other user to the electronic device 100, a voice sample for the other user to the electronic device 100, or the like.

Figure 7:
FIG. 7 illustrates an example electronic device according to some implementations.

FIG. 7 illustrates select example components of the electronic device 100 that may be used to implement the techniques and functions described herein according to some implementations. Some common examples of the electronic device 100 may include digital media devices and eBook readers 100-1; tablet computing devices 100-2; desktop computing devices, terminals, and workstation computing devices 100-3; smart phones and mobile devices 100-4; laptop and netbook computing devices 100-5; televisions, gaming systems, and home and automotive electronic devices 100-6; and wearable electronic devices 100-7. For instance, the electronic device 100 may be a user-transportable device, a mobile device, or other portable device, such as a cellphone, a smart phone, a tablet computing device, an electronic book (eBook) reader device, a media player, a navigation device, a portable gaming device, a laptop computer, or other typically handheld devices that are easily passed between users. Additionally, in some examples herein, the electronic device 100 may be a wearable device or a device that is otherwise transported by a user, such as headphones, a helmet, augmented reality glasses, an article of clothing, a device retained in an armband or supported on a belt, a watch, a bracelet, an anklet, or any other portable or mobile electronic device having components capable of performing the recognition functions described herein, and that may be moved by, carried by, worn by, or supported by a person. Additionally, in some examples, herein, the electronic device may not be a handheld or user-transportable device, an instead may be a less mobile device such as a television, desktop computer, automotive electronic device, gaming console, appliance, tool and the like.

In a very basic configuration, the electronic device 100 includes, or accesses, components such as at least one control logic circuit, central processing unit, or processor 702 and one or more computer-readable media 704. Each processor 702 may itself comprise one or more processors or processing cores.

In addition, depending on the configuration of the electronic device 100, the computer-readable media 704 may be an example of tangible non-transitory computer-readable media and may include volatile and nonvolatile memory and/or removable and non-removable media implemented in any type of technology for storage of information, such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the electronic device 100 may access external storage, such as RAID storage systems, storage arrays, network attached storage, storage area networks, cloud storage, or any other medium that can be used to store information and that can be accessed by the processor 702 directly or through another computing device or network. Accordingly, the computer-readable media 704 may be computer storage media able to store instructions, modules or components that may be executed by the processor 702.

The computer-readable media 704 may be used to store and maintain any number of functional components that are executable by the processor 702. In some implementations, these functional components comprise instructions or programs that are executable by the processor 702 and that, when executed, implement operational logic for performing the actions attributed above to the electronic device 100. Functional components of the electronic device 100 stored in the computer-readable media 704 may include the recognition module 102 and the security module 104, executable by the processor 702 for controlling privacy based on user recognition as discussed herein. Additional functional components stored in the computer-readable media 704 may include the recognition model 312 (not shown in FIG. 7), as described above, which may be part of the recognition module 102 or separate therefrom. Furthermore, while the recognition module 102 and the security module 104 are described separately herein for convenience of discussion, these may be combined as a single piece of executable code or incorporated into a single computer program.

Other functional components may include the operating system 324 and a user interface module 706 for controlling and managing various functions of the electronic device 100 and providing basic functionality. In some examples, the operating system 324 may manage and control at least a portion of the privacy restrictions described herein. The recognition module 102 and/or the security module 104 may be integrated into the operating system 324, or alternatively, may be separate therefrom. Additionally, the computer-readable media 704 may include one or more applications 110, such as one or more mobile applications or other types of applications that may be executed to utilize the electronic device 100 for perform various functions and uses. In some examples herein, one or more of the applications 110 may be configured to control itself for implementing the privacy restrictions described herein. Depending on the nature and purpose of the electronic device 100, the electronic device 100 may include various other modules 708 for various other purposes.

In addition, the computer-readable media 704 may also store data, data structures and the like, that are used by the functional components. For example, data stored by the computer-readable media 704 may include the known user information 108 that is used by the recognition module 102 and/or the security module 104. In some cases, as described above the known user information 108 may include the known user profiles 310 and/or the known user authorization information 316 (not shown in FIG. 7). Furthermore, in some examples, the electronic device 100 may include various types of other data 710 such as the private user data 114, content items, user selected security settings 318, default security settings 320, data used by the operating system 706, and data used by the applications 110 or the other modules 708 described above. Further, the electronic device 100 may include many other logical, programmatic and physical components, of which those described are merely examples that are related to the discussion herein.

FIG. 7 further illustrates the display 202, which may be passive, emissive or any other form of display, and may have a touch sensor associated therewith. The electronic device 100 may further include the recognition devices, such as the camera 204, the microphone 206, the biometric device 208, the accelerometer 303, the touch sensor 304, as well as various types of other sensors 305, which may include an accelerometer, a gyroscope and other types of sensors. In addition, the electronic device 100 may include various other types of other input/output (I/O) components 712 such as various user controls (e.g., buttons, a joystick, a keyboard, a keypad, etc.), one or more speakers, a haptic or tactile output device, connection ports, and so forth. For example, the operating system 706 of the electronic device 100 may include suitable drivers configured to accept input from a keypad, keyboard, or other user controls and devices included as the I/O components 712. For instance, the user controls may include page turning buttons, navigational keys, a power on/off button, selection keys, and so on.

In some examples, the electronic device 100 may include at least one communication interface 714. The communication interface 714 may include one or more interfaces and hardware components for enabling communication with various other devices, such as other electronic devices 100 or other computing devices, such as directly or over a network. For example, the one or more communication interfaces 714 may support both wired and wireless connection to various networks, such as cellular networks, radio, WiFi networks, short-range or near-field networks (e.g., Bluetooth®), infrared signals, local area networks, wide area networks, the Internet, and so forth. Additionally, the electronic device 100 may include a power source, such as a battery and power control unit 716 for providing power to electronic device 100. Furthermore, the electronic device 100 may include various other components that are not shown, examples of which include removable storage, a PC Card component, and so forth, depending on the configuration and purpose of the electronic device 100.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 8:
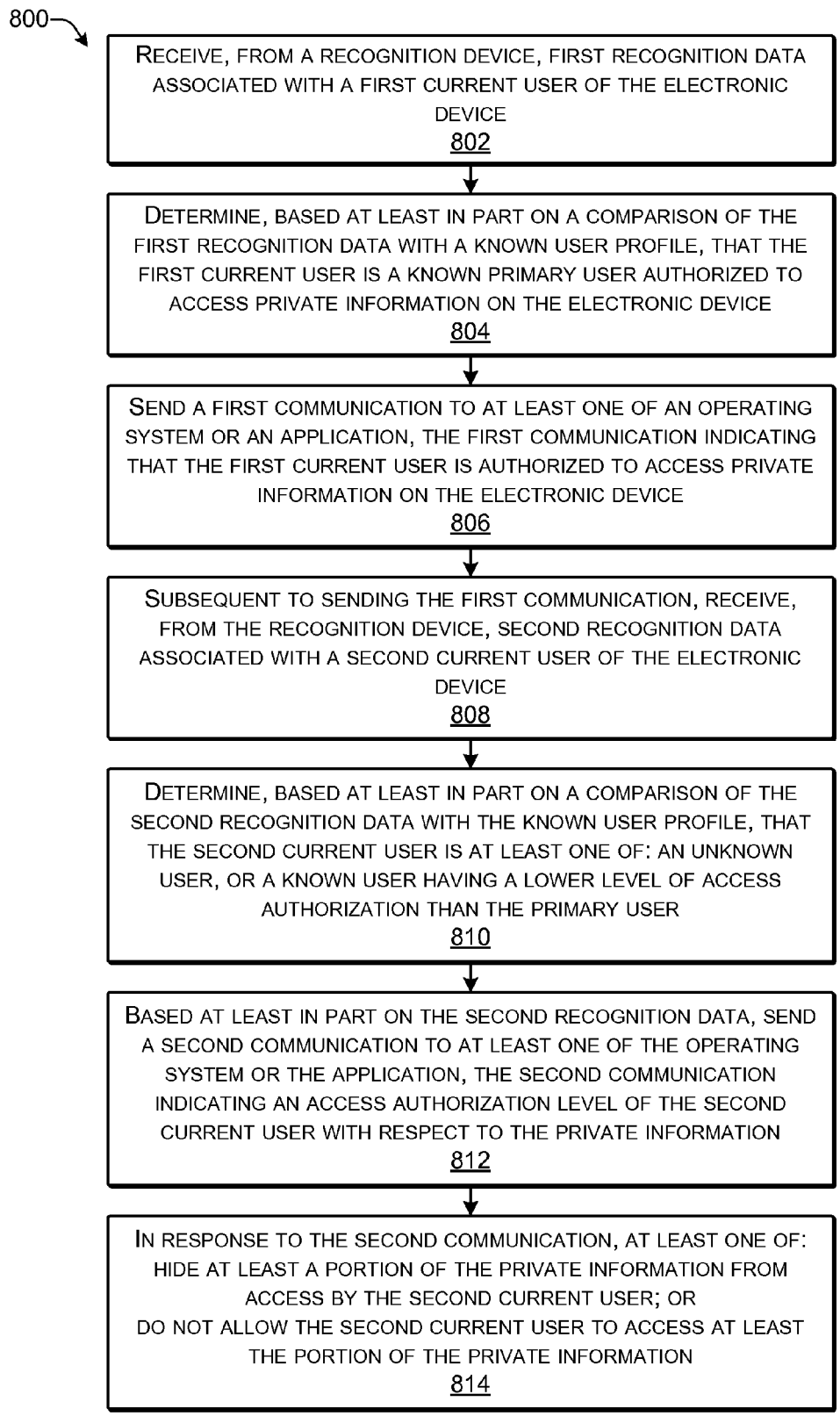
FIG. 8 is an example diagram of a process for privacy control based on user recognition according to some implementations.
Figure 9:
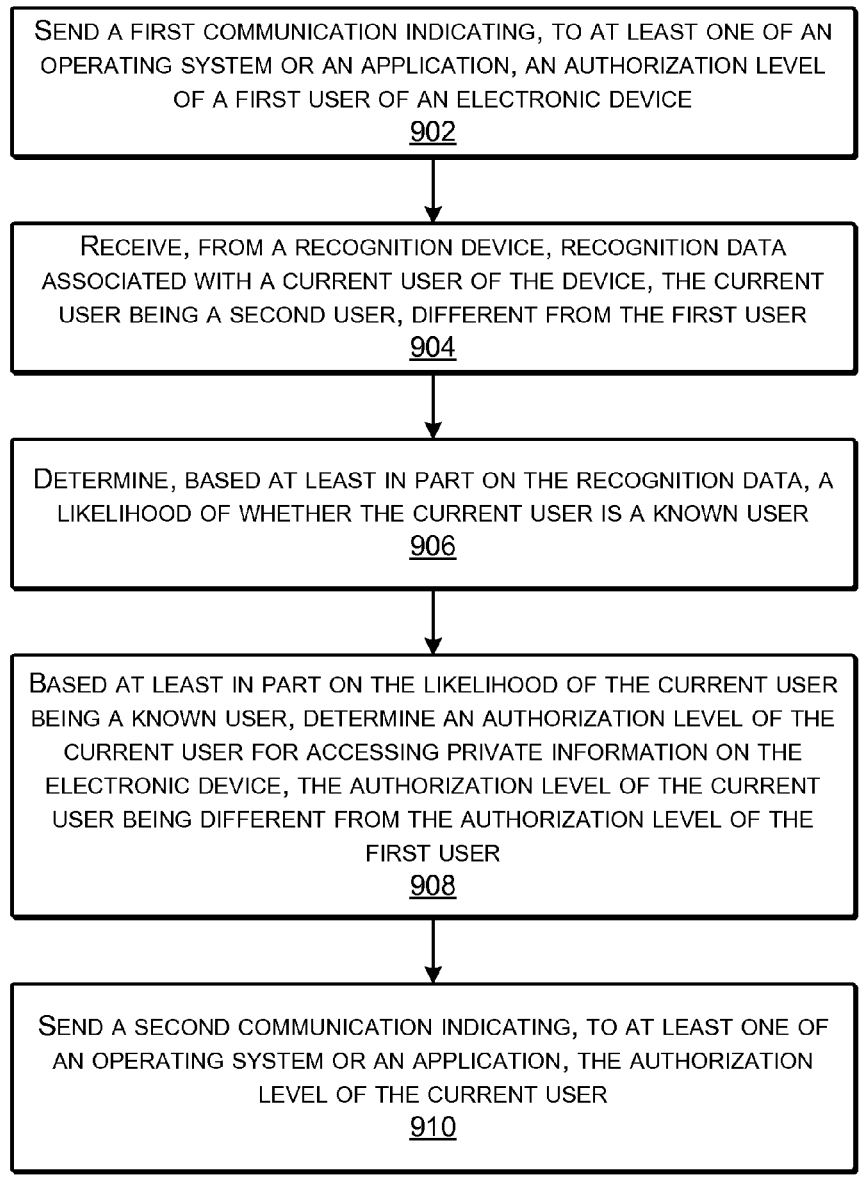
FIG. 9 is an example diagram of a process for privacy control based on user recognition according to some implementations.
Figure 10:
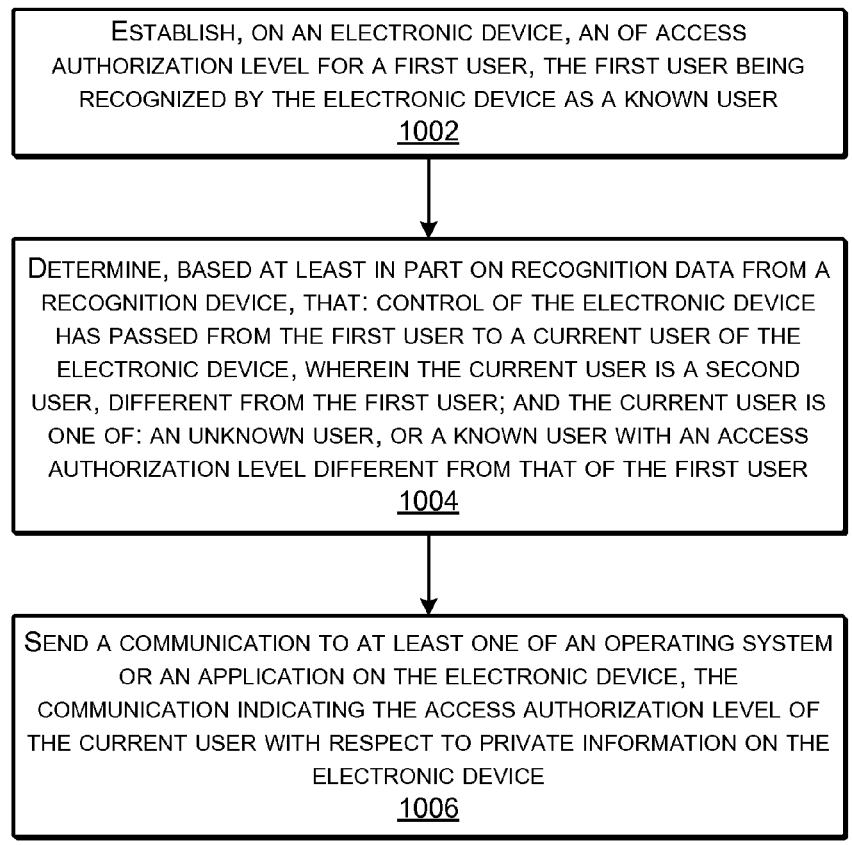
FIG. 10 is an example diagram of a process for privacy control based on user recognition according to some implementations.

FIGS. 8-10 show illustrative processes for controlling privacy based on user recognition according to some implementations. The processes described herein may be implemented by the frameworks, architectures and devices described herein, or by other frameworks, architectures and devices. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. Further, not all of the blocks are executed in each implementation.

FIG. 8 is a flow diagram of a process 800 for controlling privacy based on user recognition according to some implementations. In some examples, the process 800 may be executed, at least in part, by one or more modules, such as the recognition module 102 and the security module 104, as discussed above.

At 802, the one or more modules may receive, from the recognition device, first recognition data associated with a first current user of the electronic device. For example, the recognition data may be received from one or more of a camera, a microphone, a biometric device, an accelerometer, or a touch sensor.

At 804, the one or more modules may determine, based at least in part on a comparison of the first recognition data with a known user profile, that the first current user is a known primary user authorized to access private information on the electronic device. For example, the private information may include at least one of an application, user data, or a device setting that has been designated as private by at least one of the known primary user or by default. For example, the known user profile may include recognition data previously received by the electronic device via the recognition device during previous use of the electronic device by the known primary user. For instance, the recognition data may include at least one of: one or more images of the known primary user; an audio recording of the known primary user's voice; biometric information received from the known primary user; a touch profile generated by the electronic device for the known primary user; or a motion profile generated by the electronic device for the known primary user.

At 806, the one or more modules may send a first communication to at least one of an operating system or an application. For example, the first communication may indicate that the first current user is authorized to access the private information on the electronic device.

At 808, subsequent to sending the first communication, the one or more modules may receive, from the recognition device, second recognition data associated with a second current user of the electronic device. For example, the first current user may hand the electronic device to a second current user, or may otherwise pass control or give the second current user access to the electronic device.

At 810, the one or more modules may determine, based at least in part on the second recognition data, that the second current user is at least one of: an unknown user, or a known user having a lower level of access authorization than the primary user.

At 812, based at least in part on the second recognition data, the one or more modules may send a second communication to at least one of the operating system or the application, the second communication indicating an access authorization level of the second current user with respect to the private information. For example, the access authorization level may be less than that of the primary user.

At 814, in response to the second communication, the operating system and/or the application may perform at least one of: hiding at least a portion of the private information from access by the second current user; or not allowing the second current user to access the at least the portion of the private information. For example, the change in access authorization may take place transparently in the background when control of the electronic device is passed from the first current user to the second current user. As one example, an application may be running on the electronic device when control of the electronic device is passed from the first current user to the second current user. If the authorization level of the second current user includes permission to access the running application, the application may continue to run following passing of control to the second current user and the sending of the second communication. Alternatively, if the authorization level of the second current user does not include permission to access the running application, the application may cease running and/or may present a UI element requesting credentials to continue running. Further, the electronic device may include at least a first level of access authorization for the known primary user, a second level of access authorization for a known user that is not the known primary user, and a third level of access authorization for an unknown user, each level of access authorization enabling access to a different amount of the private information of the known primary user.

FIG. 9 is a flow diagram of a process 900 for controlling privacy based on user recognition according to some implementations. In some examples, the process 900 may be executed, at least in part, by one or more modules, such as the recognition module 102 and the security module 104 discussed above.

At 902, the one or more modules may send a first communication indicating, to at least one of an operating system or an application, an authorization level of a first user of an electronic device. For example, the first user may access the electronic device and the electronic device may establish a first access authorization level on the electronic device corresponding to the access authorization level of the first user, e.g., unknown user, known primary user, or other known user.

At 904, the one or more modules may receive, from a recognition device, recognition data associated with a current user of the device. For example, the current user may be a second user, different from the first user, such as a user that receives control of the electronic device from the first user. The current user may be recognized by visual recognition, voice recognition, biometric recognition, touch profile recognition, motion profile recognition, or the like.

At 906, the one or more modules may determine, based at least in part on the recognition data, a likelihood of whether the current user is a known user. For example, the recognition techniques herein may provide a likelihood or level of confidence as to whether the current user is a known user or unknown user. As one example, the currently received recognition data may be compared with recognition data included in one or more known user profiles maintained on the electronic device.

At 908, based at least in part on the likelihood of the current user being a known user, the one or more modules may determine an authorization level of the current user for accessing private information on the electronic device, the authorization level being different from the authorization level of the first user. For example, an unknown user may have a default low authorization access level, while a known primary user may have access to all of the private information on the device. In some examples, the electronic device includes at least a first access authorization level for a primary known user, a second access authorization level for a known user that is not the primary known user, and a third access authorization level for an unknown user, each access authorization level enabling access to a different amount of the private information.

At 910, the one or more modules may send a communication, such as by sending a communication to at least one of an operating system or an application indicating the authorization level of the current user. In some examples, the communication may be broadcast or otherwise sent upon the recognition module determining that the user is a known user having a particular authorization level, or an unknown user with a default authorization level. Alternatively, in some examples, the communication may be sent to the application by the security module in response to a poll request received from an application or the operating system, such as if the current user attempts to access the application or a feature of the operating system. Thus, as mentioned above, the change in access authorization may take place transparently in the background when control of the electronic device is passed from the first current user to the second current user while one or more applications or programs can be executing on the electronic device, and without requiring additional login, account authorization or the like.

FIG. 10 is a flow diagram of a process 1000 for controlling privacy based on user recognition according to some implementations. In some examples, the process 1000 may be executed, at least in part, by one or more modules, such as the recognition module 102 and the security module 104 discussed above.

At 1002, the one or more modules may establish, an of access authorization level for a first user, the first user being recognized by the electronic device as a known user. For instance, when the first user accesses the electronic device, the electronic device may determine the level of access authorization of the first user and can establish this level of access authorization on the electronic device, such as by sending a communication to the operating system or to a particular application.

At 1004, the one or more modules may determine, based at least in part on recognition data from a recognition device, that: control of the electronic device has passed from the first user to a current user of the electronic device, wherein the current user is a second user, different from the first user; and the current user is one of: an unknown user, or a known user with an access authorization level different from that of the first user. For example, the first user may pass control of the electronic device 100 to another user, such as by handing the electronic device to the other user, placing the device in front of the other user, or otherwise placing the electronic device within at least partial control of the other user, who then becomes the current user. The recognition data may be used to recognize that a different user is now in control of the electronic device. Further, the recognition module may not be able to recognize the current user when the current user is an unknown user. Alternatively, the recognition module may be able to recognize the current user as a known user that is not the primary user, but having an access authorization level lower than that of the primary user.

At 1006, the one or more modules may send a communication to at least one of an operating system or an application on the electronic device, the communication indicating the access authorization level of the current user with respect to private information on the electronic device. For example, the communication may indicate that the current user is not authorized to access at least a portion of private information on the electronic device. Furthermore, the sending the communication may cause the application to prevent the current user from accessing at least a portion of application data that is associated with another user of the electronic device. As one example, the application may hide itself, or may merely prevent the current user from seeing any of the user data of another user. In some examples, the communication may be sent to the application by the security module in response to a poll request received from the application, such as if the current user attempts to access the application. In some examples, the application is running when the control of the electronic device is passed from the first user to the current user, and the application continues to run following the sending of the communication if the access authorization level of the current user permits running of the application.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An electronic device comprising:
   a recognition device that includes at least one of: a camera, a microphone, a biometric feature detection device, an accelerometer, or a touch sensor;
   one or more processors;
   one or more computer-readable media; and
   one or more modules maintained on the one or more computer-readable media which, when executed by the one or more processors, cause the one or more processors to perform operations that include:
      receiving, from the recognition device, first recognition data associated with a first current user of the electronic device;
      determining, based at least in part on a comparison of the first recognition data with a known user profile, that the first current user is a known primary user authorized to access private information on the electronic device, the private information including at least one of an application, user data, or a device setting;
      sending a first communication to at least one of an operating system or the application, the first communication indicating that the first current user is authorized to access the private information on the electronic device;
      subsequent to sending the first communication, receiving, from the recognition device, second recognition data associated with a second current user of the electronic device;
      determining, based at least in part on the second recognition data, that control of the electronic device has passed from the first current user to the second current user, the second current user being different from the first current user;
      determining, based at least in part on a comparison of the second recognition data with the known user profile, that the second current user is at least one of: an unknown user, or a known user having a lower level of access authorization than the known primary user;
      based at least in part on the second recognition data, sending a second communication to at least one of the operating system or the application, the second communication indicating an access authorization level of the second current user with respect to the private information;
      the sending the second communication causing at least one of:
         hiding at least a portion of the private information from access by the second current user; or
         preventing the second current user from accessing the at least the portion of the private information;

determining that control of the electronic device has passed to the first current user; and presenting, based at least in part on the electronic device being under control of the first current user, a user interface element indicating that the second current user accessed the electronic device.

2. The electronic device as recited in claim 1, wherein the electronic device includes at least a first level of access authorization for the known primary user, a second level of access authorization for a known user that is not the known primary user, and a third level of access authorization for an unknown user, each level of access authorization enabling access to a different amount of the private information of the known primary user.

3. The electronic device as recited in claim 2, wherein, based at least in part on the second recognition data, the one or more modules:

send the second communication to change from the first level of access authorization to one of the second level of access authorization or the third level of access authorization.

4. The electronic device as recited in claim 1, wherein the known user profile comprises recognition data previously received by the electronic device via the recognition device during previous use of the electronic device by the known primary user, the recognition data including at least one of:
- one or more images of the known primary user;
- an audio recording of the known primary user's voice;
- biometric information received from the known primary user;
- a touch profile generated by the electronic device for the known primary user; or
- a motion profile generated by the electronic device for the known primary user.

5. The electronic device as recited in claim 1, wherein the user interface element provides an option to obtain additional information about the second current user.

6. A method comprising:

sending, by a processor of an electronic device, a first communication indicating, to at least one of an operating system or an application, an authorization level of a first user of the electronic device;

receiving, by the processor, from a recognition device, recognition data associated with a second user of the electronic device, wherein the second user is different from the first user;

determining, based at least in part on the recognition data, that control of the electronic device has passed from the first user to the second user;

determining, based at least in part on the recognition data, a likelihood that the second user is a known user;

based at least in part on the likelihood that the second user is the known user, determining an authorization level of the second user for accessing private information on the electronic device, wherein the authorization level of the second user is different from the authorization level of the first user;

sending a second communication indicating, to at least one of the operating system or the application, the authorization level of the second user;

presenting a user interface (UI) element indicating that an unknown user accessed the electronic device; and requesting, via the UI element, an authorization level for the unknown user.

7. The method as recited in claim 6, wherein the electronic device includes at least a first access authorization level for a primary known user, a second access authorization level for a known user that is not the primary known user, and a third access authorization level for an unknown user, each access authorization level enabling access to a different amount of the private information.

8. The method as recited in claim 6, wherein the determining the likelihood of whether the current user is a known user comprises comparing the recognition data with a known user profile, wherein the known-user profile comprises recognition data previously received by the electronic device via the one or more recognition devices during previous use of the electronic device by the known user.

9. The method as recited in claim 6, wherein based at least partly on a determination that the second user attempts to access private information not permitted by the authorization level of the second user, at least one of the operating system or the application performs at least one of:

locking the electronic device to prevent access by the second user; or requesting a credential from the second user.

10. The method as recited in claim 6, wherein based at least partly on a determination that the recognition data indicates that the likelihood that the current user is a known primary user that is authorized to access the private information is below a first recognition likelihood threshold and above a second recognition likelihood threshold, the second communication indicates that the current user is not authorized to access at least a portion of the private information.

11. The method as recited in claim 6, further comprising:

receiving, by the application, information related to the first communication; and restricting, by the application, the current user from accessing application data of a primary user of the electronic device based at least partly on a determination that the recognition data indicates that the second user is likely to not be the primary user.

12. The method as recited in claim 6, wherein the private information includes at least one of the application, user data or a device feature designated as private by at least one of a primary user of the electronic device or by a default setting.

13. The method as recited in claim 6, wherein the UI element further includes an image of the unknown user.

14. The method as recited in claim 6, wherein:

the recognition device includes at least one of an accelerometer or a touch sensor; and the determining the likelihood that the current user is a known user includes comparing the recognition data with at least one of a motion profile of the known user or a touch profile of the known user.

15. One or more non-transitory computer-readable media maintaining instructions which, when executed by one or more processors of an electronic device, cause the one or more processors to perform operations comprising:

establishing, on the electronic device, an access authorization level for a first user, wherein the first user is recognized by the electronic device as a known user;

determining, based at least in part on first recognition data from a recognition device, that:

control of the electronic device has passed from the first user to a second user of the electronic device, wherein the second user is different from the first user; and the second user is one of: an unknown user, or a known user with an access authorization level different from that of the first user;

sending a communication to at least one of an operating system or an application on the electronic device, the communication indicating the access authorization level of the second user with respect to private information on the electronic device;

determining, based at least in part on second recognition data, that control of the electronic device has passed to the first user; and presenting a user interface element indicating that the second user previously accessed the electronic device based at least in part on control of the electronic device having passed to the first user.

16. The one or more non-transitory computer-readable media as recited in claim 15, wherein the sending the communication causes the application to prevent the second user from accessing at least a portion of application data that is associated with the first user.

17. The one or more non-transitory computer-readable media as recited in claim 15, wherein:

the application is running at a time in which the control of the electronic device is passed from the first user to the second user;

the determining the control of the electronic device further comprises determining that the first recognition data indicates an implied authorization for the second user to use the electronic device; and based at least in part on the implied authorization, the application continues to run following the sending of the communication based at least partly on a determination that the access authorization level of the second user permits running of the application.

18. The one or more non-transitory computer-readable media as recited in claim 15, wherein the current user is determined to be an unknown user, the operations further comprising:

determining, based on the first recognition data, that the second user is an unknown user of the electronic device;

receiving, via the user interface, an access authorization level for the second user; and in response to receiving the access authorization level, designating the second user as a known user permitted to access at least a portion of the private information on the electronic device based on the access authorization level.

19. The one or more non-transitory computer-readable media as recited in claim 15, wherein the private information includes at least one of:

a content item;
an email;
calendar information;
payment system information;
a browser bookmark;
browsing history;
application data;
a password;
an application; or
a device feature.

20. The one or more non-transitory computer-readable media as recited in claim 15, wherein the communication is sent to the application in response to a poll received from the application regarding the access authorization level of the second user.

21. The electronic device as recited in claim 1, wherein the determining that the control of the electronic device has passed from the first user to the second user comprises determining that an acceleration value output by an accelerometer of the electronic device within a time threshold is indicative of the first user transferring the physical possession of the electronic device to the second user.

22. The one or more non-transitory computer-readable media as recited in claim 17, wherein the operations further comprise:

receiving an attempt by the second user to access private information on the electronic device that is outside a scope of the implied authorization; and prompting the second user to enter one or more credentials for identification of the second user.

* * * * *